United States Patent [19]

Rink

[11] Patent Number: 5,054,523
[45] Date of Patent: Oct. 8, 1991

[54] CONTAINMENT SYSTEM FOR FLEXIBLE UNDERGROUND PIPING

[75] Inventor: Helm A. Rink, North Haledon, N.J.

[73] Assignee: Unidynamics Corporation, New York, N.Y.

[21] Appl. No.: 498,272

[22] Filed: Mar. 23, 1990

[51] Int. Cl.$^5$ .................................................. F16L 35/00
[52] U.S. Cl. .................................. 137/377; 285/133.1; 24/279
[58] Field of Search ...................... 24/20 LS, 275, 279, 24/280; 137/899, 377; 285/133.1, 138

[56] References Cited

U.S. PATENT DOCUMENTS

| | | | |
|---|---|---|---|
| 1,473,715 | 11/1923 | Wessel | 24/279 |
| 1,497,549 | 6/1924 | Conradi | 24/279 |
| 2,690,193 | 9/1954 | Smith | 24/279 |
| 3,207,533 | 9/1965 | von Gundy et al. | 285/133.1 |
| 3,753,287 | 8/1973 | Ziemele et al. | 285/133.1 |
| 4,133,347 | 1/1979 | Mercer | 137/899 |
| 4,243,253 | 1/1981 | Rogers, Jr. | 285/138 |
| 4,854,349 | 8/1989 | Foreman | 137/899 |
| 4,886,305 | 12/1989 | Martin | 285/133.1 |
| 4,932,257 | 6/1990 | Webb | 285/133.1 |

Primary Examiner—A. Michael Chambers
Attorney, Agent, or Firm—Brooks Haidt Haffner & DeLahunty

[57] ABSTRACT

Secondary containment of the flexible hose connection between the underground hydrocarbon fuel fiberglass supply pipe and the emergency shut-off valve feeding a gasolene dispensing pump is obtained with a univerally applicable elastomeric corrugated sleeve that is secured at opposite ends, respectively, to the supply pipe and an adapter at the valve by non-metallic clamps. The clamps are of split ring construction with an initial small gap at the end of a projecting lip which is compressed upon tightening a glass reinforced Nylon bolt. This ensures smooth uniform contact with the sleeve for a full 360° circumferentially. Adapters provide the "nipple" surface to which the sleeve is clamped. An air valve is provided in the sleeve to permit pressure testing and to enable leak detection, if desired.

45 Claims, 6 Drawing Sheets

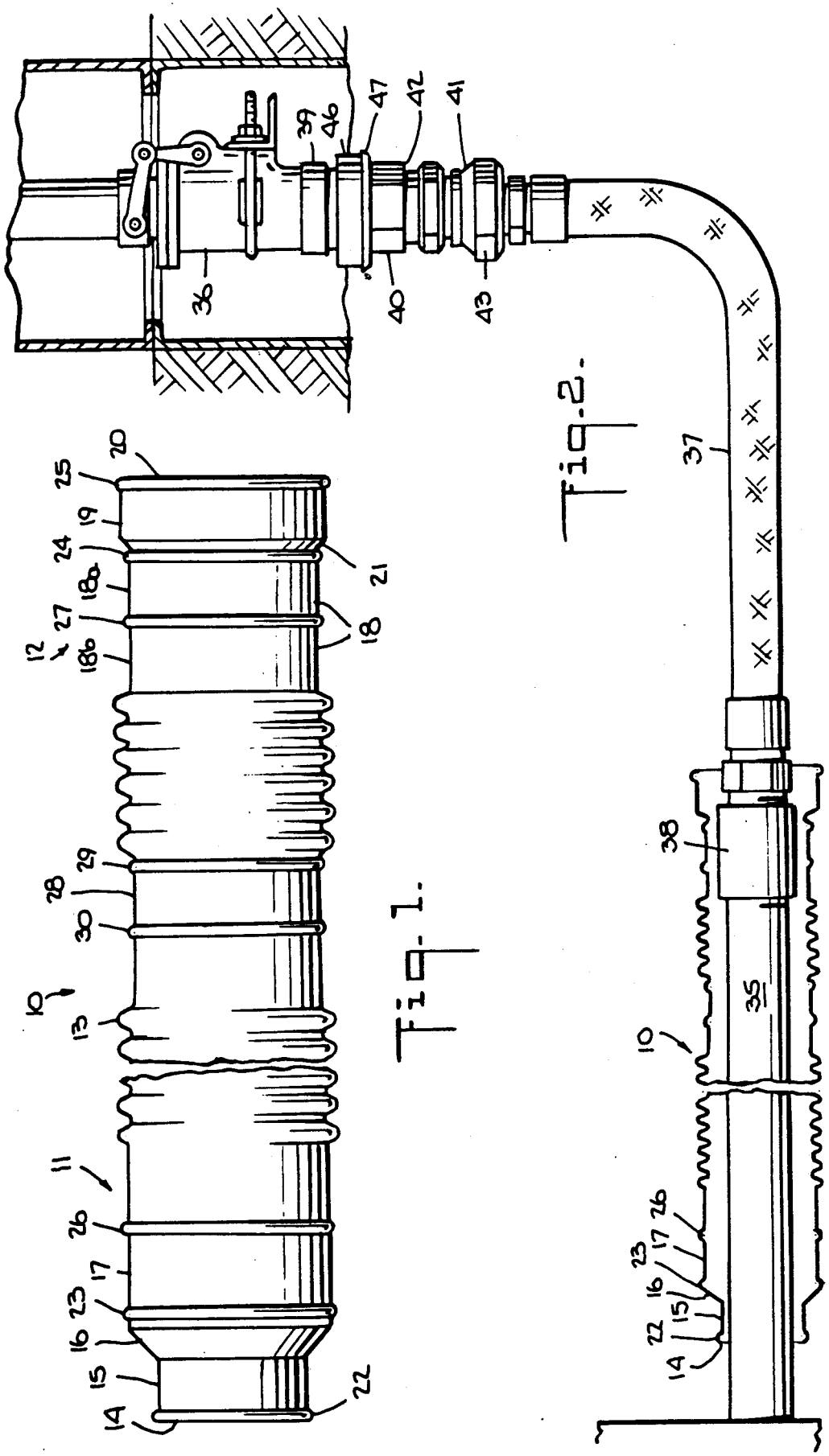

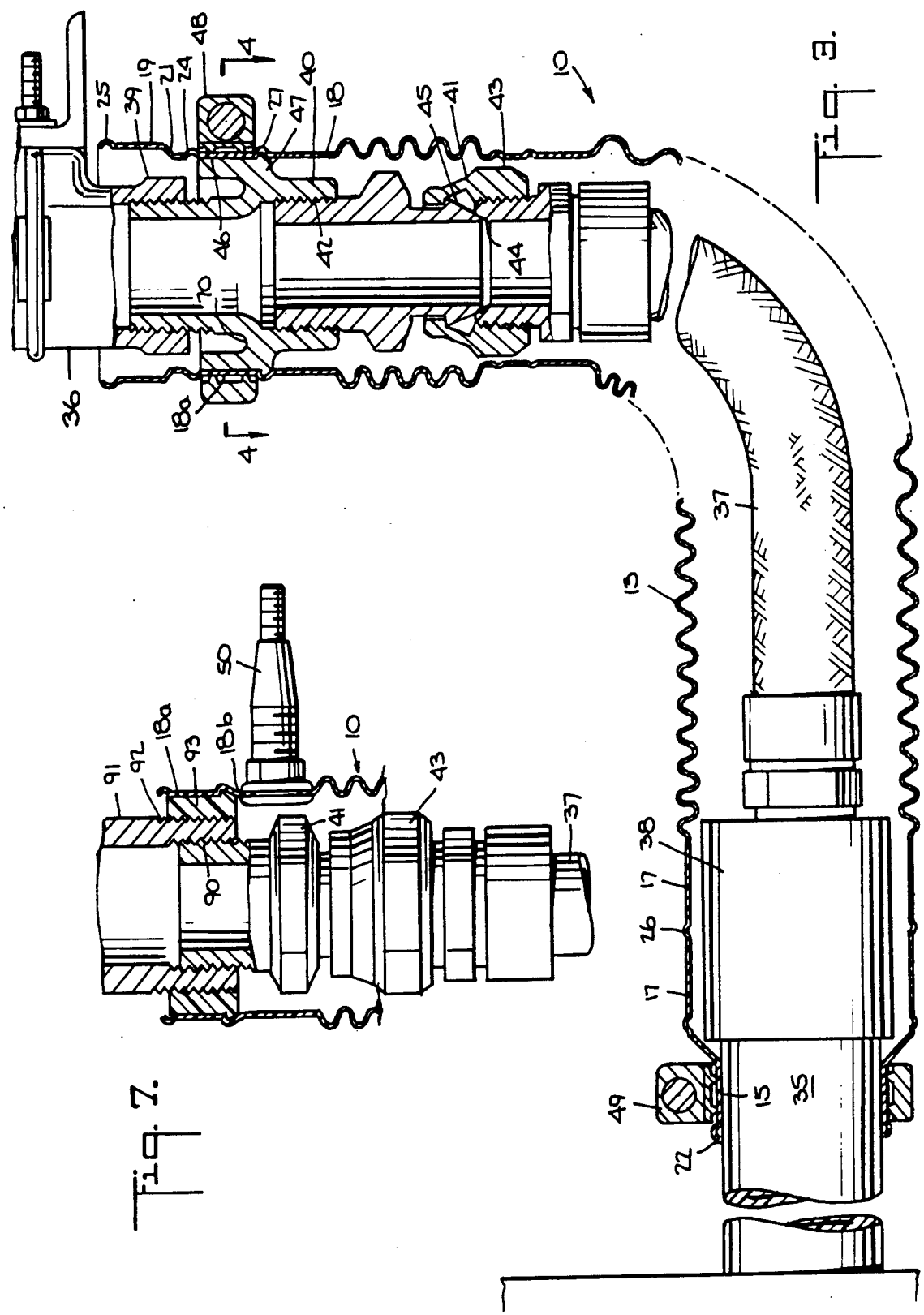

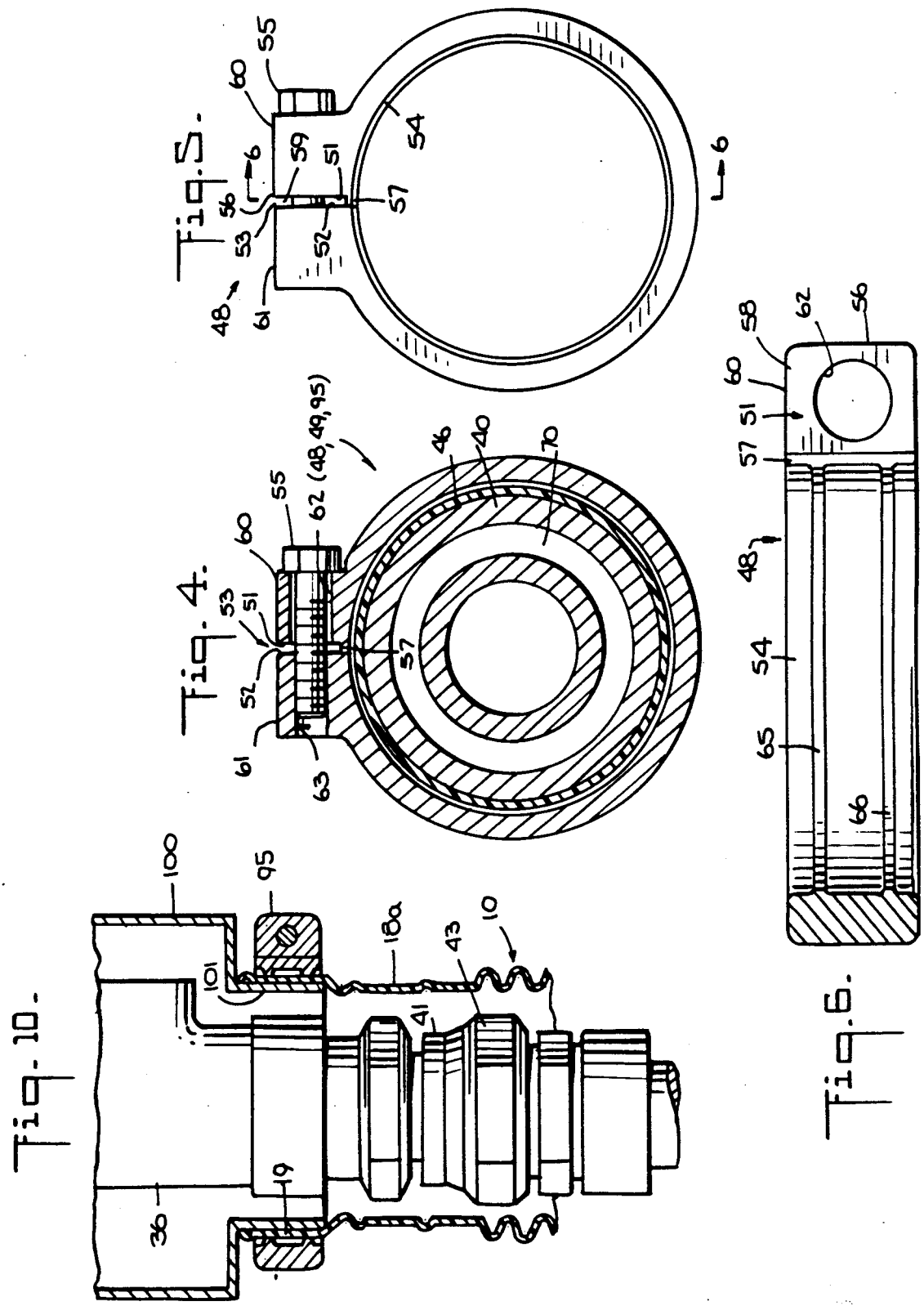

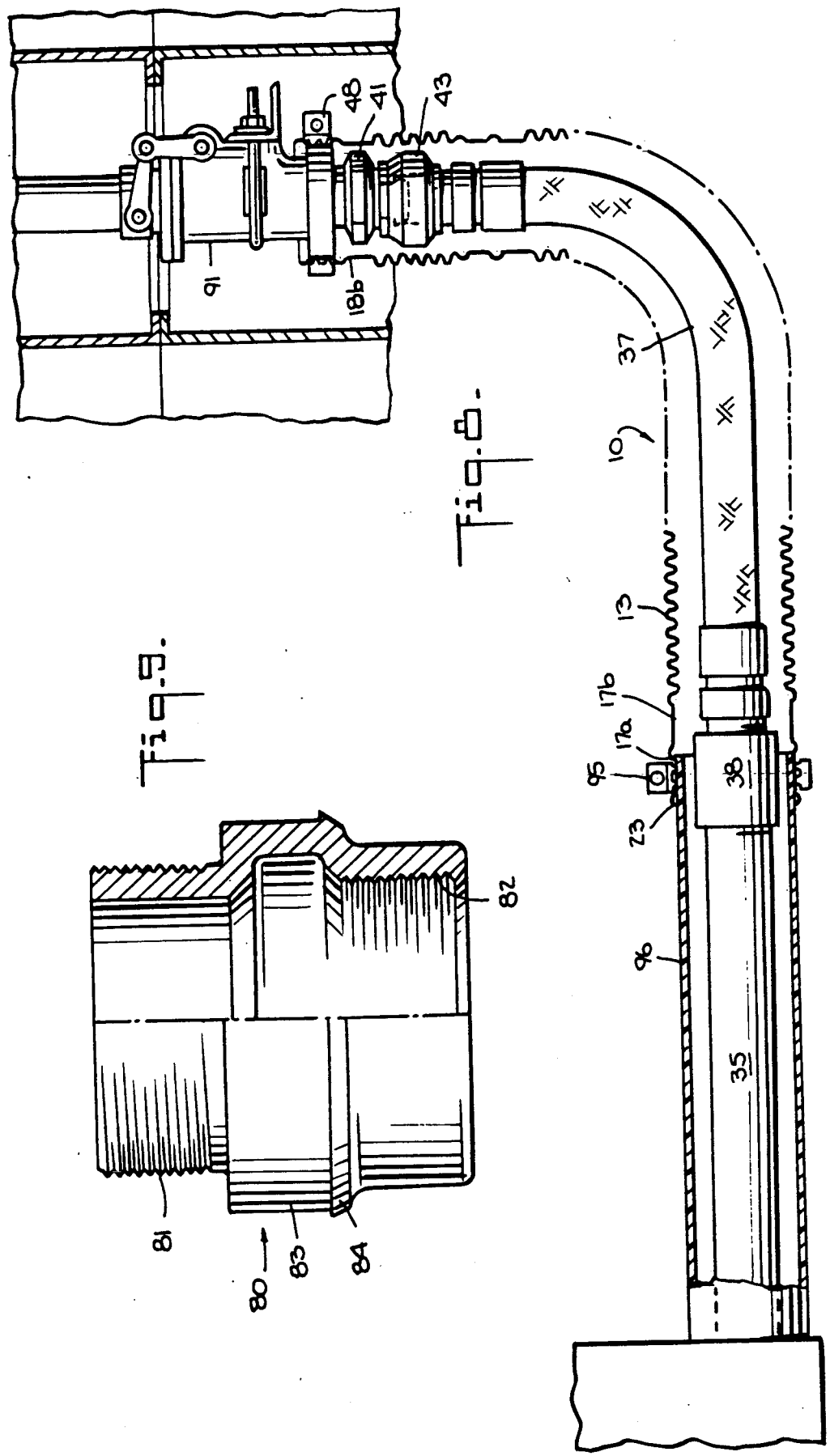

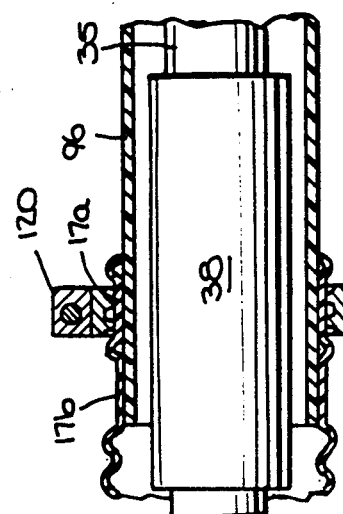
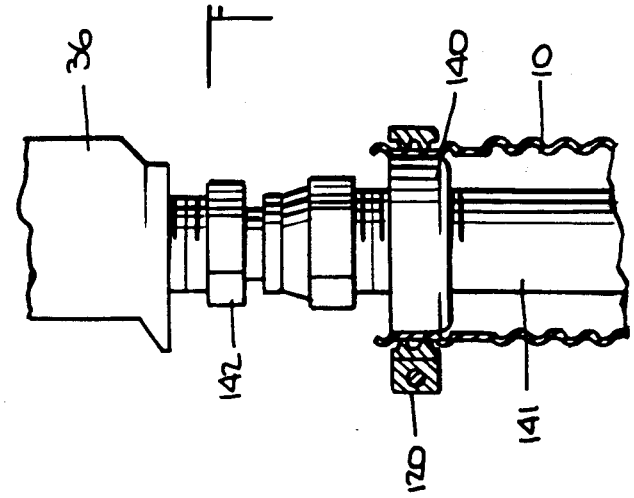
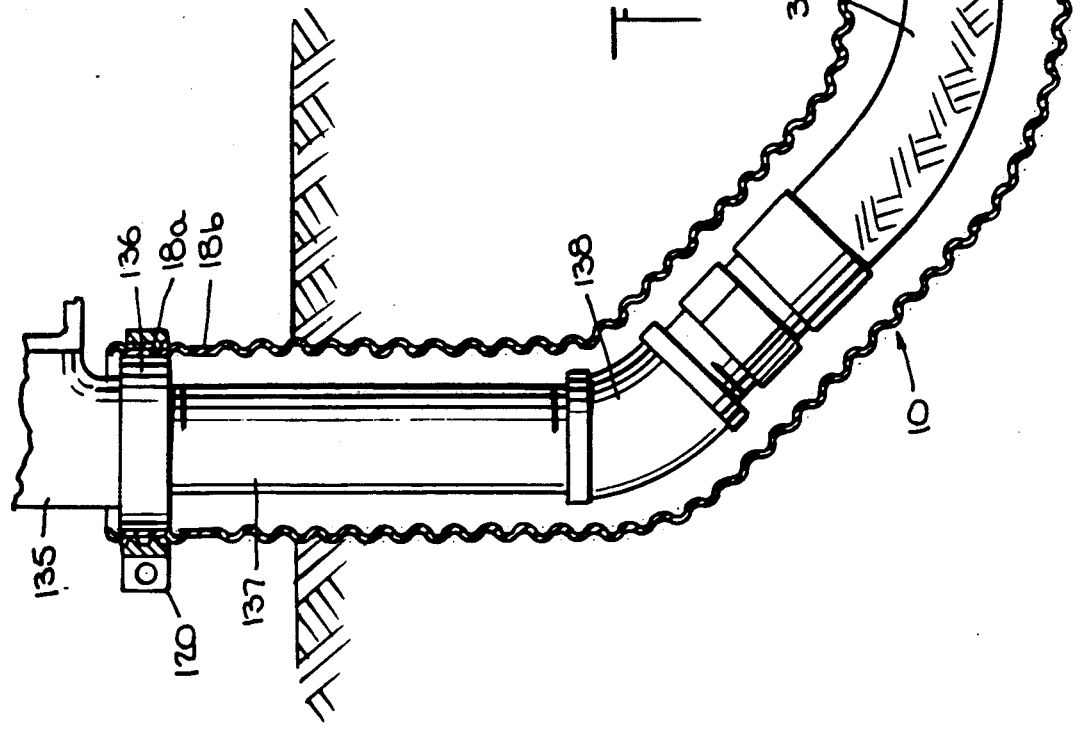

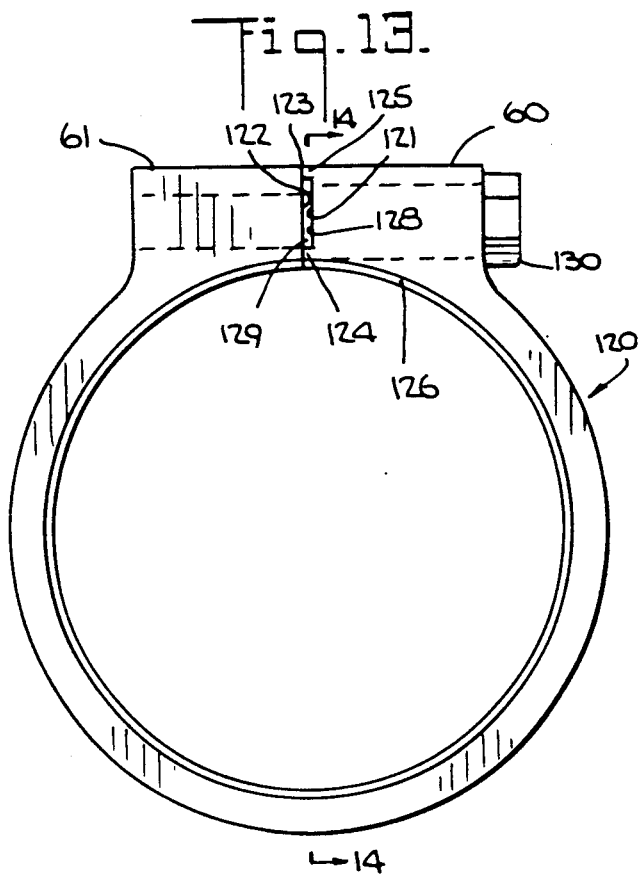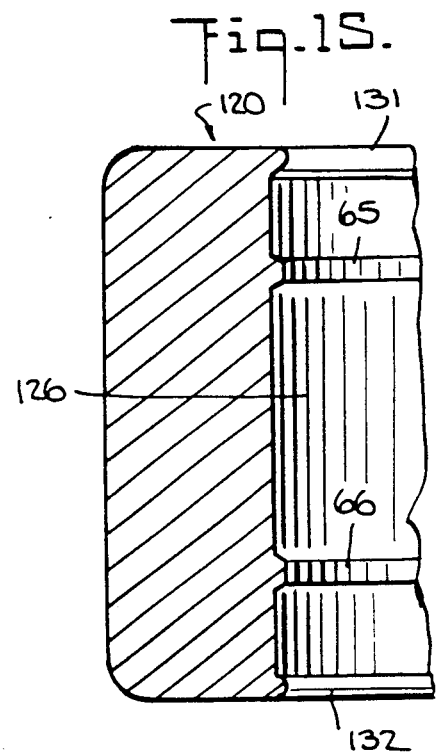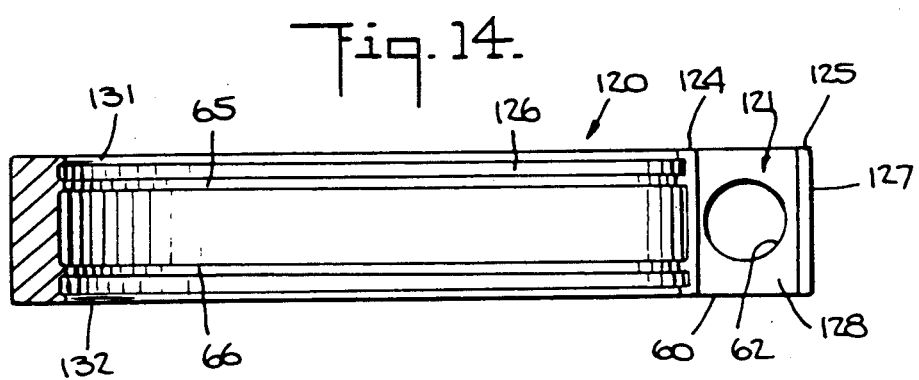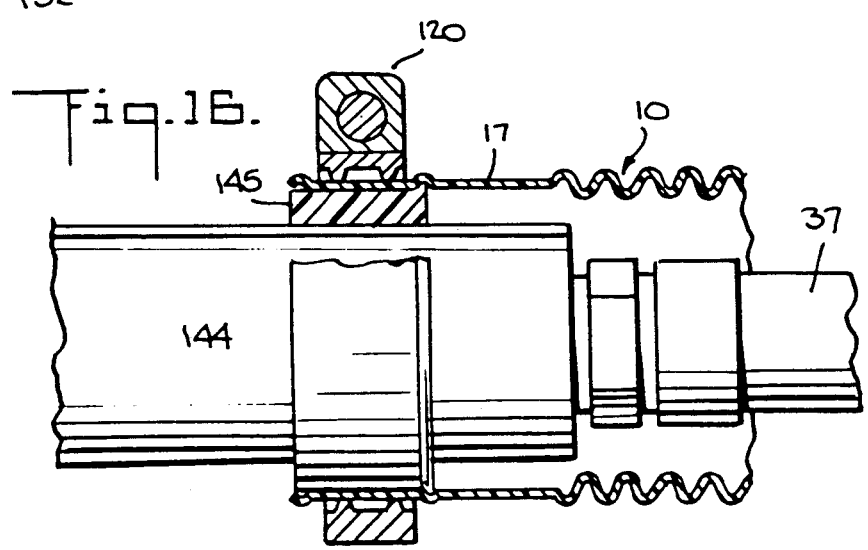

5,054,523

CONTAINMENT SYSTEM FOR FLEXIBLE UNDERGROUND PIPING

BACKGROUND OF THE INVENTION

The present invention relates to secondary containment of underground piping and, more particularly, to secondary containment of the flexible hose connections between the underground fiberglass supply pipes and the emergency shut-off valves associated with aboveground pumps for dispensing hydrocarbon fuels.

As part of the effort to protect the environment gasoline service stations have had to install emergency shut-off valves below each gasoline pump in the island supporting the pump. The required shut-off valve is tripped either by heat from fire melting a fusible link or by having its outlet neck sheared off if a pump is knocked over or dislodged from the island. In order for the shearing protection to be effective, the valve body must be anchored rigidly to a structural member, for example, a steel angle iron or the like, within the island. The valve has to be mounted in a vertical position with its inlet directed downwardly.

Because of the corrosion problems underground, the piping from the underground storage tank is constructed at present of reinforced fiberglass which is brought up to the vicinity of the emergency shut-off valve. Heretofore, to accommodate the requisite bend from the fiberglass pipe to the valve, the two have been joined by a length of flexible hose and appropriate adapter fittings to accommodate differences in pipe diameters, materials, and valve inlet port openings. For increased protection against ground contamination, the fiberglass supply pipe is frequently surrounded by a secondary containment pipe, also of fiberglass, disposed concentrically about the primary supply pipe. To provide secondary containment of the flexible hose section, a flexible sleeve has been used by at least one manufacturer secured to the fiberglass supply pipe at one end and to the valve housing at the other end by respective metal clamps. Unfortunately, these metal clamps have proven to be a weak link in the system due to corrosion. Moreover, the known containment sleeve has not included provision for connection to a fiberglass containment pipe as distinguished from the smaller diameter primary supply pipe, and has the capability of withstanding a maximum test pressure of less than 10 p.s.i.

As a result of studying the various plumbing installations used by the numerous petroleum companies throughout the United States, it has been discovered that numerous installations surround a 2" nominal diameter supply pipe with a 3" nominal diameter containment pipe while others use the supply pipe alone. Some use an emergency shut-off valve with an externally threaded inlet stub while others do not. Some use an emergency valve with an internally threaded inlet port of 1½" n.p.t. while others use a valve with a 2" n.p.t. inlet port. And in a few instances an enclosure is disposed about the valve with a short stack surrounding the valve inlet stub, it being contemplated that a containment sleeve be coupled to the stack.

SUMMARY OF THE INVENTION

With the above as background, it is an object of the present invention to provide a containment kit and system of universal application.

Another object of the invention is to provide a containment system free of underground corrosion problems.

Yet another object of the invention is to provide a containment system that is easy to install and enables convenient checking of primary conduit integrity through pressure testing.

A further object of the invention is to provide a universal containment sleeve adaptable to most, if not all, underground hydrocarbon fuel piping systems.

Another object of the invention is to provide a nonmetallic clamp for securing the containment sleeve about and to an underlying cylindrical surface of right section.

Still another object is to provide such clamp so constructed as to constrict uniformly circumferentially to apply uniform sealing pressure to said sleeve around the entire circumference thereof.

Yet another object is to provide a containment kit capable of withstanding a test pressure of at least 30 p.s.i.

In accordance with one aspect of the present invention there is provided a clamp for applying radially inwardly directed pressure uniformly circumferentially about a cylindrical surface of circular right section, said clamp comprising a split ring of substantially rigid non-metallic material extending between first and second end faces that are in confrontation on opposite sides of a split, the inside diametral surface of said ring having a uniform radius circumferentially about said ring for substantially a full 360° when said two end faces are in stress free contact, at least one of said end faces having a circumferentially projecting lip portion adjacent said inside diametral surface and a recessed region contiguous to said lip portion which region is spaced from said opposite end face by a predetermined gap when said lip portion is in stress free contact with said opposite end face, and means for applying force to said ring on opposite sides of said split in a direction tending to close said gap which means is constructed in relation to the compressive yield strength of said lip portion for causing said lip portion to yield and said gap to decrease with concomitant reduction in the circumference of said inside diametral surface.

In accordance with another aspect of the present invention there is provided a containment sleeve for underground hydrocarbon fuel piping systems comprising a thin walled tube of hydrocarbon fuel resistant polyester elastomer having first and second end sections joined by a corrugated intermediate section, said first end section, commencing adjacent its free end, comprising a first right circular cylindrical portion of a first internal diameter, a frustoconical transition portion, and a second right circular cylindrical portion of a second internal diameter larger than said first diameter, said transition portion joining said first and second portions, and said second portion being joined to said currugated intermediate section whose minimum internal diameter is less than said second diameter but greater than said first diameter, and said second end section comprises a third right circular cylindrical portion joined to said intermediate section and having an internal diameter substantially equal to said minimum diameter of said intermediate section.

In accordance with a further aspect of the present invention there is provided a containment system for underground piping of hydrocarbon fuel between an underground fiberglass supply pipe and an emergency shut-off valve in which a length of flexible hose is coupled between said supply pipe and said valve, comprising in combination a containment sleeve surrounding said flexible hose and establishing a secondary containment between said fiberglass pipe and said valve, said sleeve comprising a thin walled tube of hydrocarbon fuel resistant polyester elastomer having first and second end sections joined by a corrugated intermediate section, said first end section comprising at least a first right circular cylindrical portion of a first internal diameter, said second end section comprising at least a second right circular cylindrical portion having an internal diameter substantially equal to the minimum diameter of said intermediate section, an adapter joined to said shut-off valve and having at least a portion with a right circular cylindrical radially outer surface having a larger outside diameter than the outside diameter of said flexible hose, said second cylindrical portion of said sleeve being disposed concentrically about said portion of said adapter with said adapter portion and said second cylindrical portion dimensioned for a close fit therebetween, said first cylindrical portion of said sleeve being disposed concentrically about said fiberglass supply pipe and dimensioned for a close fit about said pipe, and individual clamps surrounding said first and second cylindrical portions of said sleeve applying radially inwardly directed fluid sealing pressure uniformly circumferentially about the underlying cylindrical surfaces, each said clamp comprising a split ring of substantially rigid non-metallic material extending between first and second end faces that are in confrontation on opposite sides of a split, the inside diametral surface of said ring having a uniform radius circumferentially about said ring for substantially a full 360°, at least one of said end faces having a projecting lip portion adjacent said inside diametral surface in compressive engagement with said opposite end face, at least a major portion of the remainder of said at least one end face having a surface stepped back from the extremity of said lip portion, and means applying force to said ring on opposite sides of said split in a direction forcing said lip portion against said opposite end face with sufficient force to cause compression of said lip portion and reduction in the circumference of said inside diametral surface to apply said fluid sealing pressure.

In accordance with yet another aspect of the present invention there is provided a containment kit for use with a system of underground piping of hydrocarbon fuel that has an emergency shut-off valve connected through a length of flexible hose to a fiberglass supply pipe within a fiberglass piping system, said kit comprising in combination a containment sleeve for surrounding said flexible hose and establishing a secondary containment between said fiberglass piping system and said valve, said sleeve comprising a thin walled tube of hydrocarbon fuel resistant polyester elastomer having first and second end sections joined by a corrugated intermediate section, an adapter for connection to said shut-off valve and having at least a portion with a right circular cylindrical radially outer surface larger in diameter than the outside diameter of said flexible hose, said first end section of said sleeve having a first cylindrical zone of circular right section constructed for disposition concentrically about said portion of said adapter with a close fit therebetween, said second end section of said sleeve having a second and third cylindrical zone, each of circular right section but of different internal diameters, said second cylindrical zone being constructed for disposition concentrically about said fiberglass supply pipe with a close fit in the absence of a fiberglass containment pipe surrounding said supply pipe, said third cylindrical zone being constructed for disposition with a close fit, after elimination of said second zone, concentrically about a fiberglass containment pipe when present, and individual clamps for surrounding each of said cylindrical zones that overlie with a close fit either said adapter portion or a fiberglass pipe for applying radially inwardly directed fluid sealing pressure uniformly circumferentially about the underlying cylindrical surfaces of circular right section, each said clamp comprising a split ring of substantially rigid non-metallic material extending between first and second end faces that are in confrontation on opposite sides of a split, the inside diametral surface of said ring having a uniform radius circumferentially about said ring for substantially a full 360°, at least one of said end faces having a projecting lip portion adjacent said inside diametral surface normally in close proximity to said opposite end face, at least the major portion of the remainder of said at least one end face having a surface stepped back from the extremity of said lip portion, and means for applying force to said ring on opposite sides of said split in a direction to force said lip portion against said opposite end face with sufficient force to cause compression of said lip portion and reduction in the circumference of said inside diametral surface to apply said fluid sealing pressure.

BRIEF DESCRIPTION OF THE DRAWINGS

The invention will be better understood after reading the following detailed description of the presently preferred embodiments thereof with reference to the appended drawings in which:

FIG. 1 is a plan view of a containment sleeve constructed in accordance with the present invention;

FIG. 2 is an elevational view, partly in section, showing the essential components of a typical installation of supply pipe, emergency shut-off valve and interconnecting flexible hose and fittings as presently in wide use, with the containment sleeve of FIG. 1 disposed about the supply pipe at an initial stage of assembly;

FIG. 3 is a view similar to FIG. 2 restricted to the containment sleeve area, drawn to an enlarged scale and in longitudinal section, showing the containment sleeve in its completely assembled disposition secured by clamps and showing details of adapter fittings constructed in accordance with the invention;

FIG. 4 is a transverse sectional view taken along line 4—4 in FIG. 3;

FIG. 5 is a plan view of the clamp in FIG. 4;

FIG. 6 is a sectional view of the clamp taken along line 6—6 in FIG. 5;

FIG. 7 is a fragmentary view, partly in section, showing both another embodiment of the present invention and the optional installation in the containment sleeve of an air valve for pressure testing the containment assembly;

FIG. 8 is a view similar to FIG. 1 showing a modified assembly using the adapter fitting shown in FIG. 7 and connecting to a fiberglass containment pipe surrounding the supply pipe;

FIG. 9 is a quarter sectional view through a modified adapter fitting;

FIG. 10 is a view similar to FIG. 7 showing a further modification of the invention;

FIG. 11, is a fragmentary longitudinal sectional view showing a further embodiment of the invention with a metallic nipple and elbow interposed between the flexible hose and the emergency shut-off valve;

FIG. 12 is a fragmentary view similar to FIG. 11 of a system using a modified nipple where the seat for the containment sleeve is provided on the nipple and a swivel adapter is interposed between the valve and nipple;

FIG. 13 is a plan view of a modified clamp configuration;

FIG. 14 is a sectional view of the clamp of FIG. 13 taken along line 14—14 in FIG. 13;

FIG. 15 is an enlarged fragmentary view of a portion of FIG. 14 showing details of a modified internal rib profile; and FIG. 16 is a fragmentary view similar, in part, to FIG. 3 but showing the primary pipe coupling provided with a seat for the containment sleeve.

The same reference numerals are used throughout the drawings to designate the same or similar parts.

DETAILED DESCRIPTION OF THE PRESENTLY PREFERRED EMBODIMENTS

Referring now to FIG. 1 of the drawings, there is shown an example of a containment sleeve, designated generally by the reference numeral 10, which is intended for protecting the underground piping used in gasoline stations. The sleeve 10 comprises a thin walled tube, preferably on the order of about 0.050" to 0.070" thick in the corrugated area, of hydrocarbon fuel resistant polyester elastomer. The presently preferred material is "Hytrel" 6108, marketed by the Dupont company.

As shown, the sleeve 10 has first and second end sections, 11 and 12, joined by a corrugated intermediate section 13. The end section 11, commencing adjacent its free end at 14, comprises a first right circular cylindrical portion 15 of a first internal diameter, a frust-conical transition portion 16, and a second right circular cylindrical portion 17 of a second internal diameter larger than said first diameter. The transition portion 16 joins the first and second portions, 15 and 17. The second portion 17 is joined to the corrugated intermediate section whose minimum internal diameter is less than the diameter of portion 17 but greater than that of the portion 15.

The second end section, 12, comprises a third right circular cylindrical portion 18 joined to the intermediate section 13 and having an internal diameter substantially equal to the minimum diameter of the intermediate section 13. As illustrated, an end portion 19 is provided at the free end 20 of the end section 12, having an internal diameter larger than the internal diameter of the portion 18 and joined by a frustoconical transition section 21 to the third cylindrical portion 18. The internal diameters of the portions 17 and 19 are substantially equal.

Each of the cylindrical portions 15, 17, 18 and 19, adjacent their respective ends that are closest to a free end of the sleeve 10, is provided with a radially outwardly projecting circumferential rib, respectively 22, 23, 24 and 25. The cylindrical portions 17 and 18 are additionally each provided at a respective longitudinally intermediate location with another radially outwardly projecting circumferential rib 26 and 27, respectively.

Finally, the corrugated section 13 comprises at a longitudinally intermediate location another right circular cylindrical portion 28 which is congruent with the cylindrical portion 18 and includes ribs 29 and 30. It should be understood that all of the ribs 22-27, 29 and 30 are shallow corrugations such that on the interior of the sleeve 10 there is a groove under each rib. Generally, the wall thicknesses of the various cylindrical portions will be greater than that in the corrugated area and may average collectively between about 0.080 and 0.120.

Referring now to FIG. 2, a typical installation is shown between an underground fiberglass primary supply pipe 35 and an emergency shut-off valve 36 wherein a length of flexible hose 37 is coupled between the supply pipe 35 and the valve 36. To accomplish this installation, the containment sleeve 10 is first slipped, small end 14 first, over the supply pipe 35, as shown, after which the supply pipe adapter collar 38 of conventional construction is attached to the pipe 35. Next, one end of hose 37 is threaded into the adapter collar 38. Alternatively, the hose 37 can be assembled to adapter collar 38 before the collar is attached to pipe 35. Common practice is to attach collar 38 to pipe 35 by bonding with a suitable adhesive.

If the valve 36 has a nominal 1½" pipe thread inlet at 39, an adapter fitting 40, best seen in FIG. 3, is threaded into the valve inlet using an appropriate thread sealing procedure. A conventional 1½" swivel adapter fitting 41 is next installed in the female threaded end, 42, of adapter 40. Then, using the swivel nut 43, the free end of hose 37 is engaged and the joint tightened until the conical seats 44 and 45 (see FIG. 3) are in fluid sealing contact. The swivel fitting 41 enables this assembly to be accomplished without requiring rotation of hose 37. Of course, it is possible to omit the swivel fitting 41, in which case the hose 37 would have to be connected to adapter 40 before collar 38 is cemented on the end of pipe 35. At this stage of the assembly, the primary system can be pressure proof tested in known manner to ensure that the joints are fluid tight.

Having established the integrity of the primary piping system, the sleeve 10 is drawn up over the hose 37 as shown in FIG. 3 until the cylindrical region 18a overlies the cylindrical seat 46 on adapter 40. Proper location can be sensed when radially projecting barb 47 on adapter 40 snaps into the groove under sleeve rib 27. In this installation, the enlarged end portion 19 is not required and can be removed at the juncture with rib 24, if desired. Alternatively, the containment sleeve can be furnished with the portions 19, 21 and 25 omitted. Next, for the present embodiment, the clamp 48 is installed. The details of the clamp construction will be described below. Suffice it to be said at this point that the clamp 48 is of split construction formed of a plastic material having sufficient elasticity to enable it to be opened and snapped radially about sleeve 10 in the region of cylindrical portion 18a. When the clamp 48 is in place and tightened, as will be explained, the opposite end of sleeve 10 should be located along supply pipe 35 in a neutral relaxed position, i.e., neither stretched nor compressed longitudinally, whereupon a second clamp, 49, similar to clamp 48 but of smaller diameter, fi not already installed on pipe 35, is snapped over the small diameter portion 15 of sleeve 10 and tightened. The rib 22 will serve to hold the clamp on the end of the sleeve until it is tightened thereabout.

If desired, the containment sleeve 10 can be furnished with an air valve 50 similar to a tire valve, installed in the cylindrical portion 18b as shown in FIG. 7. Using the valve 50, air or gas can be introduced into sleeve 10 under pressure and the containment system checked for leakage. Additionally, the valve can be used for leak detection by coupling a suitable leak detector thereto.

Referring to FIGS. 4, 5 and 6, the detailed construction of one embodiment of clamp 48 will be described, it being understood that clamp 49 can be identical in general configuration and operation, differing only in size. The clamp 48 is constructed for applying radially inwardly directed pressure uniformly circumferentially about a cylindrical surface of circular right section. The clamp 48 comprises a split ring of substantially rigid non-metallic material extending between first and second end faces, 51 and 52, that are in confrontation on opposite sides of a split, 53. At least one of the end faces, here the face 51, has a rabbet formed therein from its radially outer edge 56 creating both a projecting lip portion 57, adjacent the inside diametral surface 54, and a recessed region 58 contiguous to the lip portion 57. The region 58 is spaced from the opposite end face 52 by a predetermined gap 59 when the lip portion 57 is in stress free contact with the opposite end face 52. At the same time, the inside diametral surface 54 of the clamp 48 has a uniform radius circumferentially about said ring for a full 360°. This condition is illustrated in FIGS. 4 and 5 with the bolt 55 under less than maximum stress.

Normally, there will be a slight gap between lip 57 and face 52 when the bolt 55 is only fingertight. As presently contemplated, the gap between lip and face 52 will range between about 0.015" and 0.150".

In order to apply force to the ring 48 on opposite sides of the split 53 in a direction tending to reduce the gap 59, a pair of ears, 60 and 61, are formed integral with the ring 48, one on each side of the split 53. A smooth bore 62 is provided through one of the ears, ear 60 in the illustrated embodiment, along an axis tangential to the ring 48. A threaded bore 63 is provided through the other ear, 61, along the same axis as bore 62. Finally the threaded bolt 55 is passed through bore 62 and threadedly engaged in bore 63, as shown in the drawings.

From FIG. 6 it can be seen that the clamp 48 has two radially inwardly projecting annular ribs, 65 and 66, circumscribing the entire circumference of the inside diametral surface 54. The ribs are of shallow height sufficient to concentrate the loading on the material of the containment sleeve 10, and restrict cold flow of such material.

The clamps 48 and 49 can be fabricated entirely of "Delrin" 500 natural, a general purpose molding or extrusion acetal resin, a crystalline plastic made by the polymerization of formaldehyde, manufactured by the Dupont company. However, it is presently preferred to fabricate the clamps from "Valox" 420, a 30% glass reinforced PBT Polyester Resin, a crystalline plastic formed by the polycondensation of 1,4-Butanediol and Dimethylterephthalate, manufactured by General Electric Co. The bolt 55 is made of glass reinforced "Nylon" plastic. Now it can be explained and understood that as the bolt 55 is tightened, the clamp ears 60 and 61 will be drawn together, first closing the gap between the lip 57 and face 52 and thereafter applying high compressive force to the projecting lip portion 57. The ears 60 and 61 and bolt 55 are constructed in relation to the compressive yield strength of the lip portion 57 so as to cause the lip portion 57 to yield and the gap 59 to shrink with concomitant reduction in the circumference of the inside diametral surface 54.

As explained above, before sleeve clamping force is applied there is only a small gap between the lip portion 57 and the end face 52. Thus, the clamp ring substantially uniformly encircles the underlying plastic containment sleeve without any risk of pinching the sleeve 10. The Hytrel material of the sleeve has sufficient stiffness and hardness that it cannot extrude through the small initial gap and get pinched. Moreover, contracting pressure is exerted uniformly about essentially the entire circumference of the sleeve 10 ensuring a leakproof seal even when the sleeve is of thin wall construction, as thin as 0.050", and of a relatively hard material. At the same time the clamps 48 and 49 are non-metallic and are not subject to corrosion failure when buried underground.

As shown in FIG. 3, the adapter 40 is designed for use with a valve 36 having a nominal 1½" inlet. This adapter is molded from "Delrin" 500 resin to eliminate all chance of corrosion. The undercut 70 serves to reduce distortion due to thermal effects when molding and aids in controlling the O.D. of the surface 46. The adapter has a male threaded end that threads into the valve inlet, as shown, and has a female threaded end for receiving the male threaded end of swivel adapter 41. All of the thread diameters will usually be the same as that of the valve inlet port 39.

Some shut-off valves have a 2" inlet. In that event, the adapter shown in FIG. 9 will replace adapter 40. Referring to FIG. 9, the adapter, designated generally by the numeral 80, has male and female threaded ends, 81 and 82, each having a nominal 2" pipe thread, and a cylindrical seat 83 bordered at one side by the annular barb 84. The O.D. of seat 83 is preferably the same as the O.D. of seat 46 on adapter 40 so that portion 18a of sleeve 10 can be clamped about seat 83 using a clamp 48. At present it is preferred that seats 46 and 83 both have the same nominal O.D. of about 3" with the I.D. of portions 18a and 18b having substantially the same 3" nominal value. The precise dimensions of both presently used are about 1/10" larger. The clamp 48 should be dimensioned accordingly with a nominal I.D. slightly larger to allow for the wall thickness of the sleeve 10, but small enough to ensure developing the desired sealing pressure.

Turning now to FIG. 7, there is shown another modification of the invention for use when the inlet 90 of the shut-off valve 91 is provided with a male thread 92. With this valve, the adapter 93 can be in the form of a simple internally threaded collar whose outer surface is identical to the seat 83 and barb 84 on the adapter 80 in FIG. 9. As illustrated in FIG. 7, the portion 18a of sleeve 10 can be clamped about the collar 93 by a clamp (not shown) in the same fashion as the assembly in FIG. 3. Of course, now the swivel adapter 41 is threaded directly into the valve inlet 90, and the remainder of the assembly can be the same as in FIG. 3.

In certain installations the primary supply pipe 35 is surrounded by a secondary containment pipe, also of fiberglass, somewhat as illustrated in FIG. 8 to which attention should now be directed. The valve end of the installation is shown as based upon the embodiment of FIG. 7 but could be as described with reference to FIG. 3, or FIG. 9. At the supply side of the installation, the smaller diameter portions 15 and 22 of sleeve 10 have been cut off leaving rib 23 at the end of the sleeve.

Generally, the containment pipe has a nominal O.D. of 3.5" and, therefore, the cylindrical sections 17a and 17b both have a nominal I.D. of 3.5" such that the portion 17a can be secured by a clamp 95 in sealed relation directly about pipe 96. The spacing of portion 17a longitudinally away from the beginning of the corrugated portion 13 by portion 17b is to provide for a certain amount of intrusion of pipe 96 into sleeve 10 when the outer surface of pipe 96 near its end is tapered. This ensures that a non-tapered region will underly the portion 17a and clamp 95.

Clamp 95 should have a nominal I.D. slightly larger than 3.5", depending upon the wall thickness of the sleeve 10, selected to ensure developing the desired sealing pressure.

The supply pipe 35 generally has a nominal O.D. of $2\frac{3}{8}$". Therefore the smaller diameter portion 15 should have an I.D. of about $2\frac{3}{8}$" nominal and the clamp 49 a nominal I.D., slightly larger to accommodate the wall thickness of sleeve 10, but small enough to ensure developing the desired sealing pressure.

Referring to FIG. 1, it should now be apparent that where a shorter sleeve 10 is required, the righthand end as viewed in the drawing can be removed by cutting just to the right of rib 29. Now, sleeve portion 28 can be used in the same way as portions 18a and 18b.

Turning now to FIG. 10, there are a few installations in which the emergency shut-off valve is surrounded by a metallic enclosure 100 provided with a short stack or stub 101. The nominal O.D. of the stack 101 is about 3.5". The enlarged end portion 19 of sleeve 10 has an I.D. of about 3.5" so that it can be clamped about stack 101 by a clamp 95, identical to the one used in the assembly of FIG. 8, to secure the opposite end of sleeve 10 to the pipe 96. With the installation of FIG. 10, there is no need for an adapter fitting such as 40, 80 or 93. The swivel fitting 41 is installed directly into the inlet of the shut-off valve.

While the clamp described above with reference to FIGS. 4, 5 and 6 works satisfactorily for certain purposes, it may not be capable of developing sufficient force consistently for developing a liquid-tight seal on the containment sleeve capable of passing a pressure test at a test pressure of at least 30 p.s.i. after a period of below ground use of at least 30 years. Two problems have been discovered, one arises from long term stress relaxation of the resin while the other arises from the springiness of the material and cocking of the ears 60 and 61 when bolt 55 exerts force beyond that needed to cause lip 57 to engage surface 52. The line of contact of lip 57 acts as a fulcrum about which the ears cock and distort the diametral surface 54 of the clamp causing reduction in sealing efficiency.

The foregoing drawbacks are avoided with the preferred clamp construction illustrated in FIGS. 13 to 15 to which attention should now be directed. The clamp is designated generally by the reference numeral 120 and can be used in the previously described assemblies in place of clamps 48, 49 and 95, varying only in size. The clamp 120 comprises a split ring of substantially rigid non-metallic material extending between first and second end faces, 121 and 122, that are in confrontation on opposite sides of a split 123. At least one of the end faces, here the face 121, has a groove or channel formed therein extending parallel to the clamp axis, creating two projecting lip portions, 124 and 125, the lip 124 being adjacent the inside diametral surface 126, and the lip 125 being adjacent the radially outer edge 127, bounding a recessed region 128. The surface of the recessed region 128 is spaced from the opposite end face 122 by a predetermined gap 129 when the lip portions, 124 and 125, are in stress free contact with the opposite end face 122. At the same time, the inside diametral surface 126 of the clamp 120 has a uniform radius circumferentially about said clamp for a full 360°. This condition is illustrated in FIG. 13 with the bolt 130 under less than maximum stress.

When the bolt 130 in the clamps of FIG. 13 to 15 is only fingertight, there will usually be a slight gap between the end face 122 and both lips 124 and 125. As presently contemplated the lip-to-face gap at fingertightness will range between about 0.015" and 0.150" depending upon manufacturing tolerances.

The clamp ring 120 is provided with ears essentially the same as ring 48 and these are designated by the same reference numerals. However, from FIG. 15 it can be seen that the clamp 120 has two additional radially inwardly projecting annular ribs, 131 and 132, located along opposite edges of the ring inside diametral surface. These ribs circumscribe the entire inner circumference and are of shallow height, similar to ribs 65 and 66, sufficient to restrict cold flow extrusion of the material of the containment sleeve 10. Typically, the various ribs can have a height on the order of 1/64".

It has been found that "Delrin" 500 resin may not have sufficient resistance to stress relaxation over the long term. Instead, it is presently preferred to make the clamps of "Valox" 420 which was described above. Clamps made of "Valox" 420 resin, however, have much greater stiffness than those of "Delrin" 500 and cannot be sprung apart sufficiently to snap laterally over an installed containment sleeve. Consequently, a somewhat different assembly procedure is required. Preferably, prior to installing the bolts 130, which are made of glass reinforced "Nylon", and before installation of the containment sleeve 10, the clamp rings 120 are slipped over the ends of the containment sleeve 10 into the appropriate region 15 or 17 and 18 or 19. In this state the unstressed clamp makes a snug fit about the sleeve 10. After the sleeve is slipped into place over the respective sealing seats, for example, seat 46 adjacent the valve, and the supply pipe 35, the bolts 130 can be installed and tightened. With clamps of "Valox" 420 and appropriate dimensioning, seals of the containment sleeve can be established adequate to withstand at least 30 p.s.i. test pressure after at least 30 years in a below ground environment.

In the installations described so far, the flexible hose has been connected to the shut-off valve by a plastic adapter with or without a metal swivel adapter. Under certain conditions, damage to the gas pump resulting in fire might cause failure of the plastic adapter or of the hose due to its proximity. To overcome this problem, resort can be had to the modified installation shown in FIG. 11 to which attention should now be directed. An emergency shut-off valve 135 is provided with a containment sleeve seat 136 machined integral about the inlet to the valve. Seat 136 should have a configuration and dimensions the same as on adapter 93 in FIG. 7, and the containment sleeve will be clamped thereover in the manner shown in FIG. 7 by adding the clamp 120 of appropriate size as shown in FIG. 11. However, in order to place the plastic components of the primary conduit sufficiently below ground, a $1\frac{1}{2}" \times 8"$ pipe nipple 137 terminating in a 45° elbow 138 is threaded directly into the inlet of valve 135. Of course, if the valve has a 2" inlet, a 2"×8" pipe nipple would be used. As shown, the end fitting of the hose 37 is threaded directly into the elbow 138. To effect this assembly, it is presently preferred to install in sequence the nipple 137, connected directly to the valve, the elbow 138 and then the hose 37 connected to elbow 138. Next, the containment sleeve 10 with clamps installed at both ends is slipped over the hose 37, elbow 138 and nipple 137 and pushed back to expose the free end of the hose to which the fiberglass coupling 38 can now be attached. The coupling 38 can then be connected to supply pipe 35 by an appropriate cement or other suitable means. Now sleeve 10 is slid back over the supply pipe, here the secondary containment pipe 96. The opposite end of the sleeve 10 is located over the seat 136 whereupon both clamps 120 are tightened.

Although not shown in the drawings, it may be preferred to install a swivel adapter between hose 37 and fiberglass pipe coupling 38 to facilitate interconnecting the hose 37 and coupling 38. In such case the coupling 38 can be joined to pipe 35 and the swivel adapter can be installed in the free end of connector 38. Then the swivel nut on the swivel adapter can be used to establish connection to the hose 37.

Where the valve inlet is threaded externally rather than provided with an integral seat, a separate adapter 93 as shown in FIG. 7 can be used in FIG. 11. However, if the valve has neither an integral seat or external threads, the sealing seat will be provided mounted on the nipple. This modification is shown in FIG. 12 wherein an annular seat 140 is secured about a nipple 141 near the threaded end which is connected to valve 36. As shown in FIG. 12, a metallic swivel adapter 142 is threaded into the inlet of valve 36 and the pipe nipple 141 is threaded into the adapter 142. Because of the interposition of the swivel adapter 142, the nipple 141 need only be 6" long rather than 8". The remainder of the assembly can be the same as any of the embodiments already described. Of course, the 6" or 8" nipple length is not critical, it only being necessary to space the non-metallic hose 37 a safe distance below ground.

Referring now to FIG. 16, there are situations where, although there is no secondary containment pipe about the primary pipe 35, the containment sleeve either cannot be used with the reduced diameter portion 15 or does not have such portion. This would be the case, for example, whenever the exposed length of the supply pipe 35 is insufficient to enable the sleeve 10 to be slipped far enough over the supply pipe to expose the end of the supply pipe 35 for attaching coupling 38 and hose 37 thereto. In this situation the sleeve 10 must be slipped over the hose 37 which has already been attached to the valve, in the manner described above with reference to FIG. 11. Since the section 15 would be too small to slip over the hose fittings and then back over the subsequently installed coupling 38, such section must be removed. Consequently, it is not possible to connect the sleeve 10 to pipe 35 as shown in FIG. 3. In this situation, as shown in FIG. 16, a ring shaped element 145, bearing the requisite sealing seat and barb as previously described, can be formed integral with or joined to a coupling 144 by any suitable means. Then the end of sleeve 10 can be clamped to element 145 by use of a clamp 120 in a manner that should now be readily apparent.

From the foregoing it should be understood that the sleeve 10 along with the various adaptors 40, 80, 93 and 145, clamps, 48, 49, 95 and 120, nipples 137 and 141, and elbow 138 have universal application. From these components a containment kit can be assembled with any needed adapter, the appropriate clamp sizes, the sleeve 10, and appropriate nipple and elbow to be used with any of the many installation combinations found in the field.

Having described the present invention with reference to the presently preferred embodiments thereof, it will be apparent to those skilled in the present art that numerous changes in construction can be incorporated without departing from the true spirit of the invention as defined in the appended claims.

What is claimed is:

1. A clamp for applying radially inwardly directed pressure uniformly circumferentially about a cylindrical surface of circular right section, said clamp comprising a split ring of substantially rigid non-metallic material extending between first and second end faces that are in confrontation on opposite sides of a split, the inside diametral surface of said ring having a uniform radius circumferentially about said ring for substantially a full 360° when said two end faces are in stress free contact, at least one of said end faces having a circumferentially projecting lip portion adjacent said inside diametral surface and a recessed region contiguous to said lip portion which region is spaced from said opposite end face by a predetermined gap when said lip portion is in stress free contact with said opposite end face, and means for applying force to said ring on opposite sides of said split in a direction tending to close said gap which means is constructed in relation to the compressive yield strength of said lip portion for causing said lip portion to yield and said gap to decrease with concomitant reduction in the circumference of said inside diametral surface.

2. A clamp according to claim 1, wherein said inside diametral surface has at least one radially inwardly projecting annular rib circumscribing the entire circumference.

3. A clamp according to claim 2, wherein said non-metallic material is PBT polyester resin.

4. A clamp according to claim 3, wherein said force applying means comprises first and second ears integral with said split ring, one on each side of said split, a smooth bore through one of said ears along an axis tangential to said ring, a threaded bore through the other of said ears along the same said axis, and a substantially rigid non-metallic threaded bolt passing through said smooth bore and threadedly engaged in said threaded bore.

5. A clamp according to claim 4, wherein said bolt is of glass reinforced nylon.

6. A clamp according to claim 1, wherein said non-metallic material is a PBT polyester resin.

7. A clamp according to claim 6, wherein said force applying means comprises first and second ears integral with said split ring, one on each side of said split, a smooth bore through one of said ears along an axis tangential to said ring, a threaded bore through the other of said ears along the same said axis, and a substantially rigid non-metallic threaded bolt passing through said smooth bore and threadedly engaged in said threaded bore.

8. A clamp according to claim 7, wherein said bolt is of glass reinforced nylon.

9. A clamp according to claim 1, wherein said force applying means comprises first and second ears integral with said split ring, one on each side of said split, a smooth bore through one of said ears along an axis tangential to said ring, a threaded bore through the other of said ears along the same said axis, and a substantially rigid non-metallic threaded bolt passing through said smooth bore and threadedly engaged in said threaded bore.

10. A clamp according to claim 9, wherein said bolt is of glass reinforced nylon.

11. A clamp according to claim 1, wherein said at least one end face has a second circumferentially projecting lip portion adjacent the radially outer edge of said one end face, and said lip portions each has a surface that contacts said opposite end face which surfaces have a total area that is less than 25% of the total area of said at least one end face.

12. A clamp according to claim 11, wherein said lip portion end-face-contacting surfaces have a total area between about 7% and 8% of the total area of said at least one end face.

13. A containment sleeve for underground hydrocarbon fuel piping systems comprising a thin walled tube of hydrocarbon fuel resistant polyester elastomer having first and second end sections joined by a corrugated intermediate section, said first end section, commencing adjacent its free end, comprising a first right circular cylindrical portion of a first internal diameter, a frusto-conical transition portion, and a second right circular cylindrical portion of a second internal diameter larger than said first diameter, said transition portion joining said first and second portions, and said second portion being joined to said currugated intermediate section whose minimum internal diameter is less than said second diameter but greater than said first diameter, and said second end section comprises a third right circular cylindrical portion joined to said intermediate section and having an internal diameter substantially equal to said minimum diameter of said intermediate section.

14. A containment sleeve according to claim 13, wherein each of said right circular cylindrical portions, adjacent their respective ends that are closest to a free end of said sleeve, is provided with a radially outwardly projecting circumferential rib.

15. A containment sleeve according to claim 14, wherein said second and third circular cylindrical portions are each provided at a respective longitudinally intermediate location with another one of said circumferential ribs.

16. A containment sleeve according to claim 15, wherein said corrugated section comprises at a longitudinally intermediate location a fourth right circular cylindrical portion which is congruent with said third cylindrical portion.

17. A containment sleeve according to claim 13, wherein said corrugated section comprises at a longitudinally intermediate location a fourth right circular cylindrical portion which is congruent with said third cylindrical portion.

18. A containment sleeve according to claim 17, wherein each of said right circular cylindrical portions, adjacent their respective ends that are closest to a free end of said sleeve, is provided with a radially outwardly projecting circumferential rib.

19. A containment sleeve according to claim 18, wherein said second and third circular cylindrical portions are each provided at a respective longitudinally intermediate location with another one of said circumferential ribs.

20. A containment system for underground piping of hydrocarbon fuel between an underground fiberglass supply pipe and an emergency shut-off valve in which a length of flexible hose is coupled between said supply pipe and said valve, comprising in combination a containment sleeve surrounding said flexible hose and establishing a secondary containment between said fiberglass pipe and said valve, said sleeve comprising a thin walled tube of hydrocarbon fuel resistant polyester elastomer having first and second end sections joined by a corrugated intermediate section, said first end section comprising at least a first right circular cylindrical portion of a first internal diameter, said second end section comprising at least a second right circular cylindrical portion having an internal diameter substantially equal to the minimum diameter of said intermediate section, an adapter joined to said shut-off valve and having at least a portion with a right circular cylindrical radially outer surface having a larger outside diameter than the outside diameter of said flexible hose, said second cylindrical portion of said sleeve being disposed concentrically about said portion of said adapter with said adapter portion and said second cylindrical portion dimensioned for a close fit therebetween, said first cylindrical portion of said sleeve being disposed concentrically about said fiberglass supply pipe and dimensioned for a close fit about said pipe, and individual clamps surrounding said first and second cylindrical portions of said sleeve applying radially inwardly directed fluid sealing pressure uniformly circumferentially about the underlying cylindrical surfaces, each said clamp comprising a split ring of substantially rigid non-metallic material extending between first and second end faces that are in confrontation on opposite sides of a split, the inside diametral surface of said ring having a uniform radius circumferentially about said ring for substantially a full 360°, at least one of said end faces having a projecting lip portion adjacent said inside diametral surface in compressive engagement with said opposite end face, at least a major portion of the remainder of said at least one end face having a surface stepped back from the extremity of said lip portion, and means applying force to said ring on opposite sides of said split in a direction forcing said lip portion against said opposite end face with sufficient force to cause compression of said lip portion and reduction in the circumference of said inside diametral surface to apply said fluid sealing pressure.

21. A containment system according to claim 20, wherein said first right circular cylindrical portion is located adjacent the free end of said first end section, and said first end section further comprises a frusto-conical transition portion, and a third right circular cylindrical portion having an internal diameter larger than said first diameter, said transition portion joining said first and third cylindrical portions, and said third cylindrical portion being joined to said corrugated intermediate section whose minimum internal diameter is less than said internal diameter of said third cylindrical portion but greater than said first internal diameter.

22. A containment system according to claim 21, wherein said second end section comprises an end portion at its free end having an internal diameter larger than said internal diameter of said second cylindrical portion and joined by a frusto-conical transition section to said second cylindrical portion.

23. A containment system according to claim 22, wherein said valve has an internally threaded inlet port, and said adapter has a male threaded nipple and means for connecting to said flexible hose and is interposed between said flexible hose and said valve with said nipple threadedly engaged in said inlet port and said connecting means joined to said hose.

24. A containment system according to claim 22, wherein said valve has an externally threaded stub surrounding an inlet port, and said adapter has a female threaded portion threadedly joined to said threaded stub.

25. A containment system according to claim 20, wherein said valve has an internally threaded inlet port, and said adapter has a male threaded nipple and means for connecting to said flexible hose and is interposed between said flexible hose and said valve with said nipple threadedly engaged in said inlet port and said connecting means joined to said hose.

26. A containment system according to claim 20, wherein said valve has an externally threaded stub surrounding an inlet port, and said adapter has a female threaded portion threadedly joined to said threaded stub.

27. A containment system according to claim 21, wherein said valve has an internally threaded inlet port, and said adapter has a male threaded nipple and means for connecting to said flexible hose and is interposed between said flexible hose and said valve with said nipple threadedly engaged in said inlet port and said connecting means joined to said hose.

28. A containment system according to claim 21, wherein said valve has an externally threaded stub surrounding an inlet port, and said adapter has a female threaded portion threadedly joined to said threaded stub.

29. A containment system according to claim 20, wherein said second end section comprises an end portion at its free end having an internal diameter larger than said internal diameter of said second cylindrical portion and joined by a frusto-conical transition section to said second cylindrical portion.

30. A containment system according to claim 29, wherein said valve has an internally threaded inlet port, and said adapter has a male threaded nipple and means for connecting to said flexible hose and is interposed between said flexible hose and said valve with said nipple threadedly engaged in said inlet port and said connecting means joined to said hose.

31. A containment system according to claim 29, wherein said valve has an externally threaded stub surrounding an inlet port, and said adapter has a female threaded portion threadedly joined to said threaded stub.

32. A containment system according to claim 20, wherein said at least one end face of said clamp has a second circumferentially projecting lip portion adjacent the radially outer edge of said one end face which second lip portion is normally in close proximity to said opposite end face until application of said force to said ring whereupon said second lip portion is brought into engagement with said opposite end face and subjected to compression.

33. A containment system for underground piping of hydrocarbon fuel between an underground fiberglass supply pipe and an emergency shut-off valve in which a second fiberglass pipe of larger inside diameter than said supply pipe surrounds said supply pipe concentrically, and a length of flexible hose is coupled between said supply pipe and said valve, comprising in combination a containment sleeve surrounding said flexible hose and establishing a secondary containment between said second fiberglass pipe and said valve, said sleeve comprising a thin walled tube of hydrocarbon fuel resistant polyester elastomer having first and second end sections joined by a corrugated intermediate section, said first end section comprising at least a first right circular cylindrical portion of a first internal diameter, said intermediate section having a minimum internal diameter less than said first diameter, said second end section comprising a second right circular cylindrical portion having an internal diameter substantially equal to said minimum diameter of said intermediate section, an adapter joined to said shut-off valve and having at least a portion with a right circular cylindrical radially outer surface having a larger outside diameter than the outside diameter of said flexible hose, said second cylindrical portion of said sleeve being disposed concentrically about said portion of said adapter with said adapter portion and said second cylindrical portion dimensioned for a close fit therebetween, said first cylindrical portion of said sleeve being disposed concentrically about said second fiberglass pipe and dimensioned for a close fit about said second pipe, and individual clamps surrounding said first and second cylindrical portions of said sleeve applying radially inwardly directed fluid sealing pressure uniformly circumferentially about the underlying cylindrical surfaces, each said clamp comprising a split ring of substantially rigid non-metallic material extending between first and second end faces that are in confrontation on opposite sides of a split, the inside diametral surface of said ring having a uniform radius circumferentially about said ring for substantially a full 360°, at least one of said end faces having a projecting lip portion adjacent said inside diametral surface in compressive engagement with said opposite end face, at least a major portion of the remainder of said at least one end face having a surface stepped back from the extremity of said lip portion, and means for applying force to said ring on opposite sides of said split in a direction forcing said lip portion against said opposite end face with sufficient force to cause said compression of said lip portion and reduction in the circumference of said inside diametral surface to apply said fluid sealing pressure.

34. A containment system according to claim 33, wherein said valve has an internally threaded inlet port, and said adapter has a male threaded nipple and means for connecting to said flexible hose and is interposed between said flexible hose and said valve with said nipple threadedly engaged in said inlet port and said connecting means joined to said hose.

35. A containment system according to claim 33, wherein said valve has an externally threaded stub surrounding an inlet port, and said adapter has a female threaded portion threadedly joined to said stub.

36. A containment system according to claim 33, wherein said at least one end face of said clamp has a second circumferentially projecting lip portion adjacent the radially outer edge of said end face which second lip portion is normally in close proximity to said opposite end face until application of said force to said ring whereupon said second lip portion is brought into engagement with said opposite end face and subjected to compression.

37. A containment kit for use with a system of underground piping of hydrocarbon fuel that has an emergency shut-off valve connected through a length of flexible hose to a fiberglass supply pipe within a fiberglass piping system, said kit comprising in combination a containment sleeve for surrounding said flexible hose and establishing a secondary containment between said fiberglass piping system and said valve, said sleeve comprising a thin walled tube of hydrocarbon fuel resistant polyester elastomer having first and second end sections joined by a corrugated intermediate section, an adapter for connection to said shut-off valve and having at least a portion with a right circular cylindrical radially outer surface larger in diameter than the outside diameter of said flexible hose, said first end section of said sleeve having a first cylindrical zone of circular right section constructed for disposition concentrically about said portion of said adapter with a close fit therebetween, said second end section of said sleeve having a second and third cylindrical zone, each of circular right section but of different internal diameters, said second cylindrical zone being constructed for disposition concentrically about said fiberglass supply pipe with a close fit in the absence of a fiberglass containment pipe surrounding said supply pipe, said third cylindrical zone being constructed for disposition with a close fit, after elimination of said second zone, concentrically about a fiberglass containment pipe when present, and individual clamps for surrounding each of said cylindrical zones that overlie with a close fit either said adapter portion or a fiberglass pipe for applying radially inwardly directed fluid sealing pressure uniformly circumferentially about the underlying cylindrical surfaces of circular right section, each said clamp comprising a split ring of substantially rigid non-metallic material extending between first and second end faces that are in confrontation on opposite sides of a split, the inside diametral surface of said ring having a uniform radius circumferentially about said ring for substantially a full 360°, at least one of said end faces having a projecting lip portion adjacent said inside diametral surface normally in close proximity to said opposite end face, at least the major portion of the remainder of said at least one end face having a surface stepped back from the extremity of said lip portion, and means for applying force to said ring on opposite sides of said split in a direction to force said lip portion against said opposite end face with sufficient force to cause compression of said lip portion and reduction in the circumference of said inside diametral surface to apply said fluid sealing pressure.

38. A containment kit according to claim 37, wherein said second cylindrical zone is disposed adjacent the free end of said second end section of said sleeve, said third cylindrical zone is disposed adjacent said intermediate section, a frusto-conical transition portion interconnects said second and third zones, and said second and third cylindrical zones have internal diameters respectively smaller and larger than the minimum internal diameter of said intermediate section.

39. A containment kit according to claim 38, wherein said valve has an internally threaded inlet port, and said adapter has a male threaded nipple and flexible hose connecting means for interposition between said valve and said hose with said nipple threadedly engaged in said inlet port and said connecting means joined to said hose.

40. A containment kit according to claim 38, wherein said valve has an externally threaded stub surrounding an inlet port, and said adapter has a female threaded portion for threaded coupling to said threaded stub.

41. A containment kit according to claim 37, wherein said valve has an externally threaded stub surrounding an inlet port, and said adapter has a female threaded portion for threaded coupling to said threaded stub.

42. A containment kit according to claim 37, wherein said valve has an internally threaded inlet port, and said adapter has a male threaded nipple and flexible hose connecting means for interposition between said valve and said hose with said nipple threadedly engaged in said inlet port and said connecting means joined to said hose.

43. A containment kit according to claim 37, wherein said at least one end face of said clamp has a second circumferentially projecting lip portion adjacent the radially outer edge of said end face which second lip portion is normally in close proximity to said opposite end face until application of said force to said ring whereupon said second lip portion is brought into engagement with said opposite end face and subjected to compression.

44. A containment kit for use with a system of underground piping of hydrocarbon fuel that has an emergency shut-off valve connected through a length of flexible hose to a fiberglass supply pipe within a fiberglass piping system, said kit comprising in combination a containment sleeve for surrounding said flexible hose and establishing a secondary containment between said fiberglass piping system and said valve, said sleeve comprising a thin walled tube of hydrocarbon fuel resistant polyester elastomer having first and second end sections joined by a corrugated intermediate section, said first end section, commencing adjacent its free end, comprising a first right circular cylindrical portion of a first internal diameter, a frusto-conical transition portion, and a second right circular cylindrical portion of a second internal diameter larger than said first diameter, said transition portion joining said first and second portions, and said second portion being joined to said corrugated intermediate section whose minimum internal diameter is less than said second diameter but greater than said first diameter, said second end section comprising a third right circular cylindrical portion joined to said intermediate section and having an internal diameter substantially equal to said minimum diameter of said intermediate section, an end portion at the free end of said second end section, having an internal diameter larger than said third internal diameter, and joined by a frusto-conical transition section to said third cylindrical portion, an adapter for connection to said shut-off valve and having at least a portion with a right circular cylindrical radially outer surface having a larger outside diameter than the outside diameter of said flexible hose, said third cylindrical portion of said sleeve being constructed for disposition concentrically about said portion of said adapter with said adapter portion and said third cylindrical portion dimensioned for a close fit therebetween, said first cylindrical portion of said sleeve being constructed for disposition concentrically about said fiberglass supply pipe in the absence of a fiberglass containment pipe surrounding said supply pipe and dimensioned for a close fit about said pipe, said second cylindrical portion of said sleeve being constructed for disposition with a close fit concentrically about a fiberglass containment pipe when present, and individual clamps for surrounding each of said cylindrical portions of said sleeve for applying radially inwardly directed fluid sealing pressure uniformly circumferentially about the underlying cylindrical surfaces of circular right section, each said clamp comprising a split ring of substantially rigid non-metallic material extending between first and second end faces that are in confrontation on opposite sides of a split, the inside diametral surface of said ring having a uniform radius circumferentially about said ring for substantially a full 360°, at least one of said end faces having a projecting lip portion adjacent said inside diametral surface normally in close proximity to said opposite end face, at least the major portion of the remainder of said at least one end face having a surface stepped back from the extremity of said lip portion, and means for applying force to said ring on opposite sides of said split in a direction to force said lip portion against said opposite end face with sufficient force to cause compression of said lip portion and reduction in the circumference of said inside diametral surface to apply said fluid sealing pressure.

45. A containment kit according to claim 44, wherein said at least one end face of said clamp has a second circumferentially projecting lip portion adjacent the radially outer edge of said one end face which second lip portion is normally in close proximity to said opposite end face until application of said force to said ring whereupon said second lip portion is brought into engagement with said opposite end face and subjected to compression.

* * * * *